US005088567A

United States Patent [19]

Schnell et al.

[11] Patent Number: 5,088,567

[45] Date of Patent: Feb. 18, 1992

[54] RAM DEVICE WITH ECCENTRIC DRIVE

[75] Inventors: Hans Schnell; Hans Kühn, both of Hamburg; Jochen Rüsen, Quickborn-Heide, all of Fed. Rep. of Germany

[73] Assignee: Menck GmbH, Ellerau, Fed. Rep. of Germany

[21] Appl. No.: 445,698

[22] PCT Filed: Mar. 15, 1989

[86] PCT No.: PCT/DE89/00166

§ 371 Date: Dec. 15, 1989

§ 102(e) Date: Dec. 15, 1989

[87] PCT Pub. No.: WO89/08747

PCT Pub. Date: Sep. 21, 1989

[30] Foreign Application Priority Data

Mar. 16, 1988 [DE] Fed. Rep. of Germany ....... 3808708

Apr. 28, 1988 [DE] Fed. Rep. of Germany ....... 3814317

[51] Int. Cl.[5] .............................................. B23B 45/16

[52] U.S. Cl. .................................. 173/122; 105/232; 173/90

[58] Field of Search .................. 173/90, 91, 134, 135, 173/122; 405/232

[56] References Cited

U.S. PATENT DOCUMENTS 3,474,870 10/1969 Cook .................................... 173/91

4,544,040 10/1985 Sweeney .............................. 173/91

FOREIGN PATENT DOCUMENTS 3107140 11/1985 Fed. Rep. of Germany .

*Primary Examiner*—Timothy V. Eley

*Assistant Examiner*—William Fridie, Jr.

*Attorney, Agent, or Firm*—Michael J. Striker

[57] ABSTRACT

The yam device has a plurality of guides and a striking mass which is movable so as to be displaceable thereat by means of a hydraulic cylinder, wherein the hydraulic cylinder is arranged with its longitudinal axis outside the path of the center of gravity of the striking mass. The striking mass can comprise a first elastomeric and-/or plastic component and a second heavy metal component. Three guides which can be parallel to the movement path of the center of gravity are provided for the guidance of the striking mass, the striking mass is preferably constructed so as to be guided at its respective end areas. The ram device and the striking mass preferably have a symmetry plane defined by the axis of the hydraulic cylinder and the movement path of the center of gravity and the guides located out of the symmetry plane are arranged in two planes which are at an angle of 120° or less relative to each other and symmetrically disposed on each side of the symmetry axis.

10 Claims, 2 Drawing Sheets

RAM DEVICE WITH ECCENTRIC DRIVE

BACKGROUND OF THE INVENTION

The invention relates to a ram device with a plurality of guides and a striking mass which is movable at the latter so as to be displaceable by a hydraulic cylinder.

Such a ram device is known from German Patent DE-PS 31 07 140. It comprises a cylinder-piston unit which is actuated by a pressure medium and which moves a striking mass along a guide, particularly a leader, the striking mass being guided on sliding pieces or rollers. The cylinder-piston unit which is actuated by a pressure medium is arranged centrally between two guides. In order to reduce the overall length, the striking body also includes a central pocket-like recess for receiving the cylinder-piston unit. During the upward movement of the striking mass, which is hung on the cylinder-piston unit, the latter dips into the recess.

In order to prevent sound emissions, the entire piston-cylinder unit with striking body and guides is arranged inside a closed housing.

The central recess provided in the striking body for receiving the cylinder-piston unit results in a disadvantageous reduction of the striking body weight. The advantageous short overall length is achieved at the expense of reduced striking energy. Moreover, the total weight of the system and the manufacturing cost are disadvantageously increased by means of the outer steel jacket provided for the reduction of sound emission.

SUMMARY OF THE INVENTION

It is the object of the invention to provide a ram device which can deliver high striking energy in spite of a structure which is as short as possible, wherein the sound emissions are to be reduced.

In keeping with this object and others which will become apparent hereinafter, the hydraulic cylinder is arranged with its longitudinal axis outside the path of the center of gravity of the striking mass.

The arrangement of the hydraulic cylinder outside the center of the striking mass enables the use of striking masses whose weight is not reduced by means of cut out portions for the penetration by the cylinder. Since the piston rod of the hydraulic cylinder acts at the lower end of the striking mass and the cylinder-piston unit is arranged next to the striking mass, advantageously short overall lengths result for the ram device according to the invention.

Previously, it was customary to let the drive for the striking masses act centrically so that the guide forces are as low as possible. Surprisingly, it has been shown that the sound emission is reduced by means of the eccentric arrangement of the hydraulic cylinder. This effect is explained in that the eccentric arrangement leads to a defined contact of the striking mass at the guides and undefined forces accordingly no longer occur in the guides.

However, the necessary clearance within the guides and the uncontrolled striking of the guided striking mass at the guides are blamed in retrospect for part of the sound emissions.

An advantageous structure results when three guides are provided for guiding the striking mass, which guides are parallel to its movement path. The guide forces remain controllable in spite of the eccentric arrangement of the hydraulic cylinder. They are further reduced in an advantageous manner if the striking mass is guided in its respective end areas.

The arrangement of a guide on the side of the striking mass opposite the hydraulic cylinder has proven particularly favorable.

If the hydraulic cylinder and/or the guides are arranged outside the striking mass, the maintenance for the system is substantially reduced.

The guide forces can be further reduced in an advantageous manner if the axes of the guides arranged at the side of the plane of symmetry lie in planes which form an angle of 120° or less relative to one another.

The step by which the axis of the hydraulic cylinder is arranged within an imaginary prism connected the guide axes has the same effect.

An advantageously uniform loading of the material to be driven in results when the striking mass is not constructed so as to be radially symmetrical, but is constructed so as to be substantially hinge-symmetrical relative to the plane of symmetry, and the surfaces of the striking mass are preferably approximately equal at both sides of an imaginary plane through the path of the center of gravity, which plane is perpendicular to the plane of symmetry.

In one embodiment of the invention which is particularly low in sound emissions, the striking mass is provided with a blind hole. The blind hole is filled either with lead or with a composite material which comprises a first elastomeric and/or plastic component, thus forming the striking mass and a second heavy metal component.

If the striking mass includes or has a cavity in the vicinity of the cylinder, a particularly compact construction results in which the cylinder is advantageously protected, in addition.

An additional reduction in sound also results because, in the vicinity of the striking surface, the striking body dips into ring elements of the hammer frame which enclose it during the impact, so that the striking noise can not spread out freely on all sides.

Advantageously heavy striking masses can be achieved in an optimally small overall length of the entire device when the displacement of the hydraulic cylinder has an amount which substantially corresponds to the length of the striking mass.

BRIEF DESCRIPTION OF THE DRAWING

Additional advantages, details and features, according to the invention, follow from the following description of a preferred embodiment of the invention with reference to the attached drawings.

DETAILED DESCRIPTION OF THE DRAWING

Figure 1:
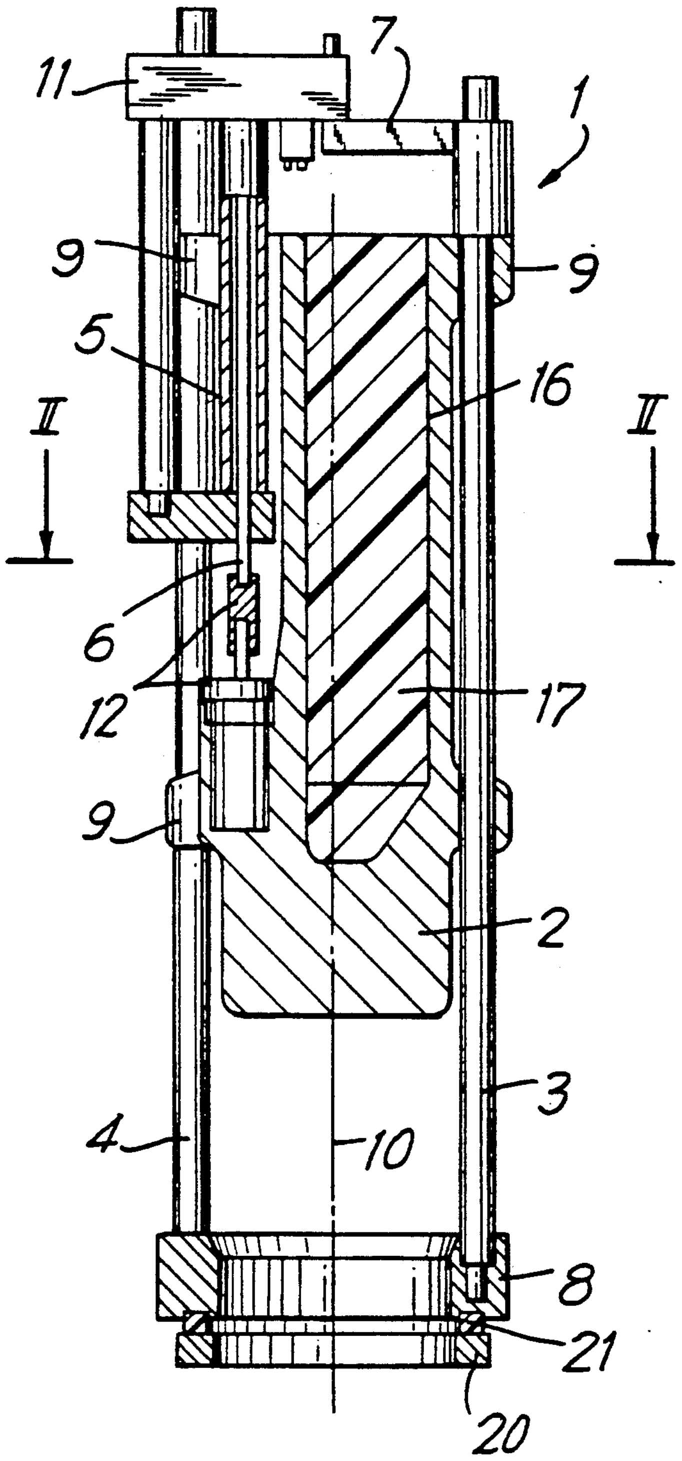
FIG. 1 is an axial cross section through the ram device according to the invention and FIG. 2 is a horizontal cross sectional view through the ram device, according to the invention, corresponding to section line II—II.

In FIG. 1, 1 designates a ram device in which the striking mass 2 is movable so as to be displaceable laterally on the guides 3, 4 by means of a hydraulic cylinder 5, which is fastened at the latter, and the piston rod 6.

The guides 3, 4 are held at their respective ends by means of the head plate 7 and the foot ring 8 in such a way that they are parallel to one another. For the purpose of guidance, the striking mass 2 is provided with guide openings 9 which are penetrated by the guides 3, 4. The center of gravity of the striking mass 2 accordingly moves on a movement path 10, shown in dash-dot lines, which is parallel to the guides 3, 4.

The ram device is supported on the material to be driven in by the support ring 20. An elastic intermediate ring 21, which dampens shocks etc., is arranged between the foot ring 8 and the support ring 20. The parts 8, 20, 21 act as a ring element which additionally hinders the generation of sound waves during the impact of the striking mass on the material to be driven in.

The hydraulic cylinder 5 with piston rod 6, which is connected with the head plate 7 via part 11, serves to drive the striking mass 2. The part 11 simultaneously serves as a mounting plate for fastening the necessary control elements for the hydraulic cylinder 5. The free end of the movable piston rod 6 is fastened at the striking mass by means of a suitably constructed coupling 12, so that the striking mass can be moved up and down by the piston rod. As can be seen from the drawing, the cylinder-piston unit acts outside the path 10 of the center of gravity of the striking mass 2.

Figure 2:
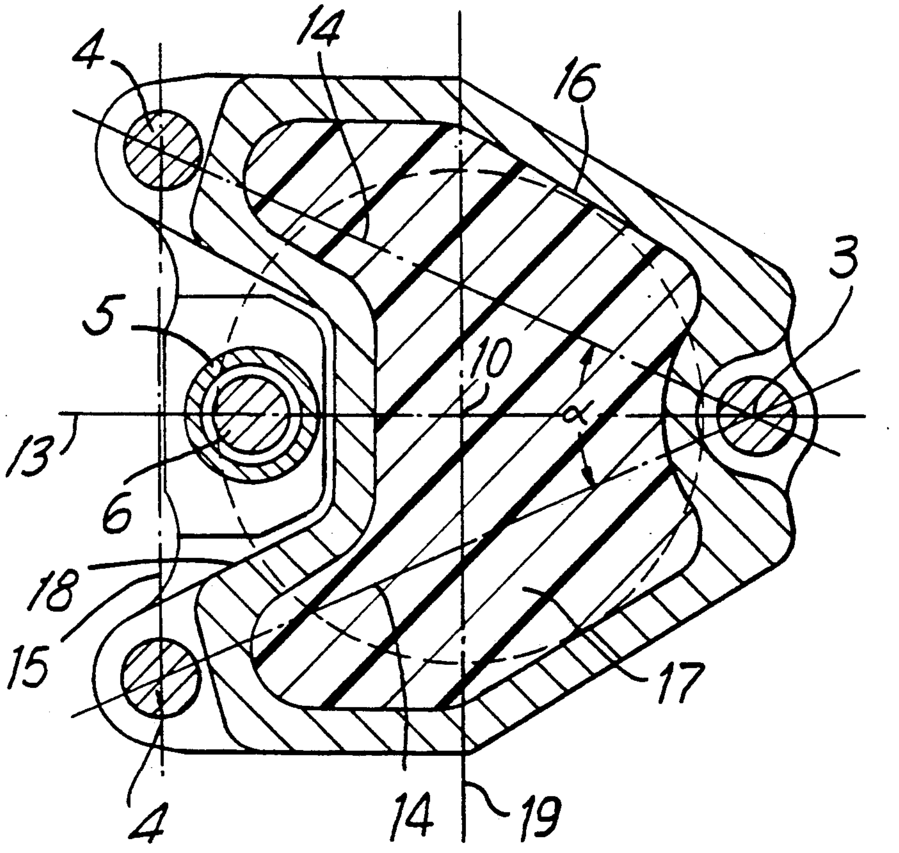

The geometrical arrangement of the guides relative to the path of the center of gravity of the striking mass and relative to the axis of the hydraulic cylinder follows from FIG. 2.

FIG. 2 shows a horizontal section according to section line II—II. It can be seen clearly that the path 10 of the center of gravity of the striking mass, the axis of the hydraulic cylinder 5 and the axis of the guide path 3 lie in a plane 13 of symmetry. The guides 4 are likewise arranged symmetrically to the plane of symmetry. Together with the axis of the guide situated in the plane 13 of symmetry, the axes of the guides 4 which are arranged to the side of the plane 13 of symmetry form imaginary planes 14 which are at an angle $\alpha$ of less than 120° relative to one another. Moreover, it can be seen that the hydraulic cylinder is not only arranged outside the path of the center of gravity of the striking mass 10, but is also arranged inside an imaginary prism connecting the axes of the guide, which imaginary prism is formed by the planes 14, shown in dash-dot lines, and the plan 15.

The cavity 18 of the striking mass 2 provides the hydraulic cylinder 5 with a particularly good protection and thus contributes to the prevention of operating disturbances.

The striking mass 2 is provided with a blind hole 16 which is open at the top and is filled with composite material 17. This composite material can be a mixture of a first plastic component and a second heavy metal component.

Accordingly, a novel ram device with eccentric drive is provided which has an advantageously short overall length and emits little sound.

In embodiment illustrated the guides are located adjacent end areas 2' of the striking mass 2 when they are located substantially outside of the striking mass 2.

It is particularly advantageous when the length of the striking mass, 1, is approximately equal to the displacement, D, shown in FIG. 1 (The displacement of the cylinder being substantially equal to the length of the piston rod).

It will be understood that each of the elements described above, or two or more together, may also find a useful application in other types of structure differing from the types described above.

While the invention has been illustrated and embodied in a ram device with eccentric drive, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed is new and desired to be protected by Letters Patent is set forth in the appended claims.

We claim:

1. A ram device, comprising at least two guides; a striking mass movable on said two guides along a movement path defined by a longitudinal axis of said ram device; and a fluid cylinder for moving said striking mass along the movement path, said fluid cylinder having a longitudinal axis extending parallel to and spaced from the longitudinal axis of said ram device and defining therewith a plane symmetry of said ram device, said at least two guides having axes extending parallel to and outside of the plane of symmetry of said ram device on respective opposite sides of the plane of symmetry and symmetrically thereto, the longitudinal axis of said fluid cylinder being located inside an angle formed by two planes passing through a respective longitudinal axis of a respective one of said at least two guides, and intersecting the plane of symmetry of said ram device; and a third guide having a longitudinal axis located in the plane of symmetry of said ram device, said striking mass having three end regions to be guided thereat, said striking mass being arranged inside an imaginary prism formed by three planes passing through said longitudinal axes of said three guides.

2. A ram device as defined in claim 1, wherein said fluid cylinder is located outside of said striking mass.

3. A ram device as defined in claim 1, wherein said angle is less than 120°.

4. A ram device as defined in claim 1, further comprising a ring element surrounding said striking mass in a vicinity of a struck surface during impact.

5. A ram device as defined in claim 1, wherein said striking mass has a blind hole filled with a composite material including a first component and a second heavy metal component.

6. A ram device as defined in claim 5, wherein said first component comprises at least one elastomeric and plastic materials.

7. A ram device as defined in claim 6, wherein a displacement path of said fluid cylinder corresponds approximately to a length of the striking mass.

8. A ram device as defined in claim 1, wherein said striking mass has approximately equal surface areas on both sides of an imaginary plane passing through the longitudinal axis of said ram device and substantially perpendicular to the plane of symmetry.

9. A ram device as defined in claim 1, wherein said striking mass has a cavity, said fluid cylinder being located inside said cavity.

10. A ram device, comprising three guides; a striking mass movable on said guides along a movement path defined by a longitudinal axis of said ram device; and a fluid cylinder for moving said striking mass along the movement path, said fluid cylinder having a longitudinal axis extending parallel to and spaced from the longitudinal axis of said ram device and defining therewith a plane a symmetry of said ram device, two of said guides having axes extending parallel to and outside of the plane of symmetry of said ram device on respective opposite sides of the plane of symmetry and symmetrically thereto, the longitudinal axis of said fluid cylinder being located inside an angle formed by two planes passing through said respective longitudinal axes of said two of said guides, and intersecting the plane of symmetry of said ram device, the longitudinal axis of said fluid cylinder being also located inside an imaginary prism formed by planes extending through said longitudinal axes of said three guides, said fluid cylinder being located outside of said striking mass, and said striking mass being symmetrical relative to said plane of symmetry.

* * * * *